(12) United States Patent
Shiga

(10) Patent No.: US 6,847,031 B2
(45) Date of Patent: Jan. 25, 2005

(54) INTERMITTENT OPERATING TYPE POINTING DEVICE

(75) Inventor: Sadakazu Shiga, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 75 days.

(21) Appl. No.: 10/309,827

(22) Filed: Dec. 4, 2002

(65) Prior Publication Data
US 2003/0112222 A1 Jun. 19, 2003

(30) Foreign Application Priority Data
Dec. 13, 2001 (JP) .......................... 2001-379461

(51) Int. Cl.⁷ .......................... G01D 5/34; G01G 5/08
(52) U.S. Cl. .......................... 250/231.13; 250/231.16; 250/221; 345/157; 345/165
(58) Field of Search .......................... 250/231.13, 231.14, 250/231.16, 231.18, 233, 205, 221; 345/157, 163–167; 341/11, 13

(56) References Cited

U.S. PATENT DOCUMENTS 4,704,523 A * 11/1987 Uchida .................. 250/231.16
5,027,109 A * 6/1991 Donovan et al. ........... 345/165
5,252,968 A    10/1993 Donovan

FOREIGN PATENT DOCUMENTS

JP        6-250784        9/1994

* cited by examiner

Primary Examiner—Kevin Pyo
(74) Attorney, Agent, or Firm—Brinks Hofer Gilson & Lione

(57) ABSTRACT

In detecting units for detecting the rotating operation of a ball, respective photoemitters serving as light sources are intermittently driven to emit light and respective photodetectors receive the light. A control unit recognizes a moving speed in the X-axial direction and that in the Y-axial direction from detection signals obtained by the detecting units. In the control operation of the control unit, when an increase in operating speed is detected, a light emitting period of each of the photoemitters is reduced. When a decrease in operating speed is detected, the light emitting period of each photoemitter is extended.

6 Claims, 5 Drawing Sheets

FIG. 4

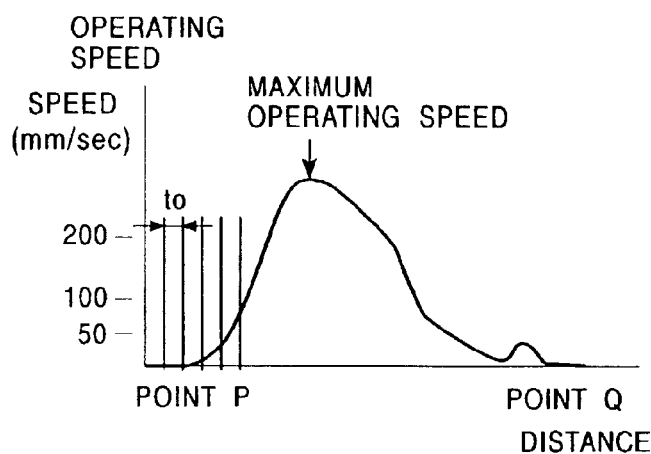

FIG. 5

|  | OPERATING SPEED | DRIVING PERIOD | |
|---|---|---|---|
| STOP | 0 mm/sec | 50 msec | SWITCH IS OPERATED OR CASE IS NOT OPERATED |
| VERY LOW SPEED MOVEMENT | 5 mm/sec | 5 msec | REPEAT STOPPING AND SLIGHTLY MOVING CASE IN FINAL POSITIONING OPERATION |
| LOW SPEED MOVEMENT | 50 mm/sec | 500 μsec | MOVE CASE SO AS TO BRING POINTER CLOSE TO TARGET POSITION |
| MEDIUM SPEED MOVEMENT | 100 mm/sec | 300 μsec | MOVE CASE WHILE VISUALLY CHECKING POINTER |
| HIGH SPEED MOVEMENT | 200 mm/sec | 150 μsec | MOVE CASE WHILE VISUALLY GRASPING GENERAL POSITION OF POINTER |
| VERY HIGH SPEED MOVEMENT | 300 mm/sec | 100 μsec | MOVE CASE SO FAST THAT USER CANNOT FOLLOW MOVEMENT OF POINTER |

INTERMITTENT OPERATING TYPE POINTING DEVICE

BACKGROUND OF THE INVENTION

1. Field of the Invention

The present invention relates to a mouse type input device which can detect the amount of movement due to an operating physical force, and more particularly to an input device which can reduce power consumption.

2. Description of the Related Art

Input devices for detecting the amount of movement thereof due to an operating physical force include the following types. Each of some type input devices has a ball-shaped or roller-shaped control element. The control element is rotated by a finger and the amount of rotation thereof is detected and is then transmitted to a host computer. Each of mouse type input devices includes a case. The case is moved while being held by a hand and the amount of movement thereof is detected.

These input devices have means for detecting the amount of movement. These detecting means have the similar structures. For example, according to the mouse type input device, a ball is rotatably held in the case. When the case is moved on a pad, the ball is rotated in association with the movement of the case. The case includes an X-axis encoder and a Y-axis encoder arranged perpendicularly to each other. The encoders are in contact with the ball and are rotated.

Each of the X-axis and Y-axis encoders has a rotary element. Each rotary element has light transmitting portions formed in the rotating direction at a predetermined pitch. A light source faces the side of each rotary element and a photodetector faces the other side of the rotary element. The photodetector intermittently receives light emitted from the light source in accordance with a rotating speed of the rotary element. The number of light receiving times of the photodetector within a predetermined time changes in accordance with the rotating speed of the rotary element. Thus, the amount of rotation of the rotary element within the predetermined time, namely, the rotating speed thereof can be detected.

Each of the X-axis encoder and the Y-axis encoder detects the amount of rotation within the predetermined time. Consequently, the amount of movement of the case and the moving speed thereof can be detected.

In the foregoing conventional input devices, generally, the light sources continuously emit light, resulting in large power consumption. It is uneconomical. Then, in some input devices, the light sources intermittently emit light every predetermined driving period, thus reducing power consumption.

On condition that the light sources intermittently emit light as mentioned above, when the case is moved at the highest speed and the rotary elements of the X-axis and Y-axis encoders are rotated at the highest speed, it is necessary to ensure resolution enough to detect the amount of movement of the case. Therefore, the driving period of each light source during which the rotating speed of the corresponding rotary element indicates the maximum value is determined as a reference. The driving period is fixed to the shortest value.

Accordingly, there are limits to which power necessary for light emission of each light source is reduced. For example, in the mouse type input device using a battery as a power supply or an input device mounted on a notebook-sized personal computer using a battery as a power supply, battery life is short.

SUMMARY OF THE INVENTION

The present invention intends to solve the above problems. It is an object of the present invention to provide an input device which can reduce power consumption without degrading resolution to detect the amount of movement.

According to the present invention, there is provided an input device including: a detecting mechanism which can detect the amount of movement due to an external operating force and which performs the intermittent detecting operation every driving period, and a control unit which changes the driving period of the detecting mechanism in accordance with the amount of movement detected by the detecting mechanism within a predetermined time, wherein data based on a detection output of the detecting mechanism is transmitted to a host computer.

According to the present invention, in the input device, the driving period is changed in accordance with the amount of movement detected by the detecting mechanism within the predetermined time, namely, a moving speed. Thus, high resolution to detect the amount of movement can be maintained and power consumption can be reduced.

Preferably, the detecting mechanism includes: an X-axis rotary member rotating in the X-axial direction; a Y-axis rotary member rotating in the Y-axial direction; light sources each of which emits detection light to the corresponding rotary member; and photodetectors each of which detects the detection light transmitting through the corresponding rotary member or the detection light reflected by the corresponding rotary member, each of the rotary members has light transmitting portions or light reflecting portions formed in the rotating direction at a predetermined pitch, each of the light sources intermittently emits light every predetermined driving period, and a light emitting period of each light source is changed in accordance with the number of light transmitting times or the number of light reflecting times in the corresponding rotary member within the predetermined time.

The present invention can also be applied to an input device which has one rotary member and detects the amount of movement in one direction.

Alternatively, the detecting mechanism includes a light source for emitting light to a reference element and a detector for detecting an image of the reference element irradiated by the light emitted from the light source to detect the movement of the image, the light source intermittently emits light every predetermined driving period, and a light emitting period of the light source is changed in accordance with a moving speed of the image of the reference element.

The present invention can also be applied to a mouse type input device and an input device which is provided for a notebook-sized personal computer and is operated with a hand.

Preferably, the control unit can recognize the amount of movement detected by the detecting mechanism every time period, and then change the driving period for the next time period in accordance with the amount of movement detected for the present time period.

For example, when the amount of movement increases for the present time period, the control unit can gradually reduce the driving period for the next time period, and when the amount of movement decreases for the present time period, the control unit can gradually extend the driving period for the next time period.

In this case, preferably, the driving period is controlled so that the amount of change in the driving period to be extended is smaller than the amount of change in the driving period to be reduced.

As mentioned above, the amount of change in the driving period to be extended is set to be small. Consequently, even when the moving speed is gradually reduced, high resolution can be maintained, thus easily preventing false detection.

BRIEF DESCRIPTION OF THE DRAWINGS

FIG. 4 is a graph showing the relationship between a detected speed and a distance when the input device is moved rapidly;

FIG. 5 is a table explaining light-emission driving periods necessary for respective operating speeds.

DESCRIPTION OF THE PREFERRED EMBODIMENTS

Figure 1:
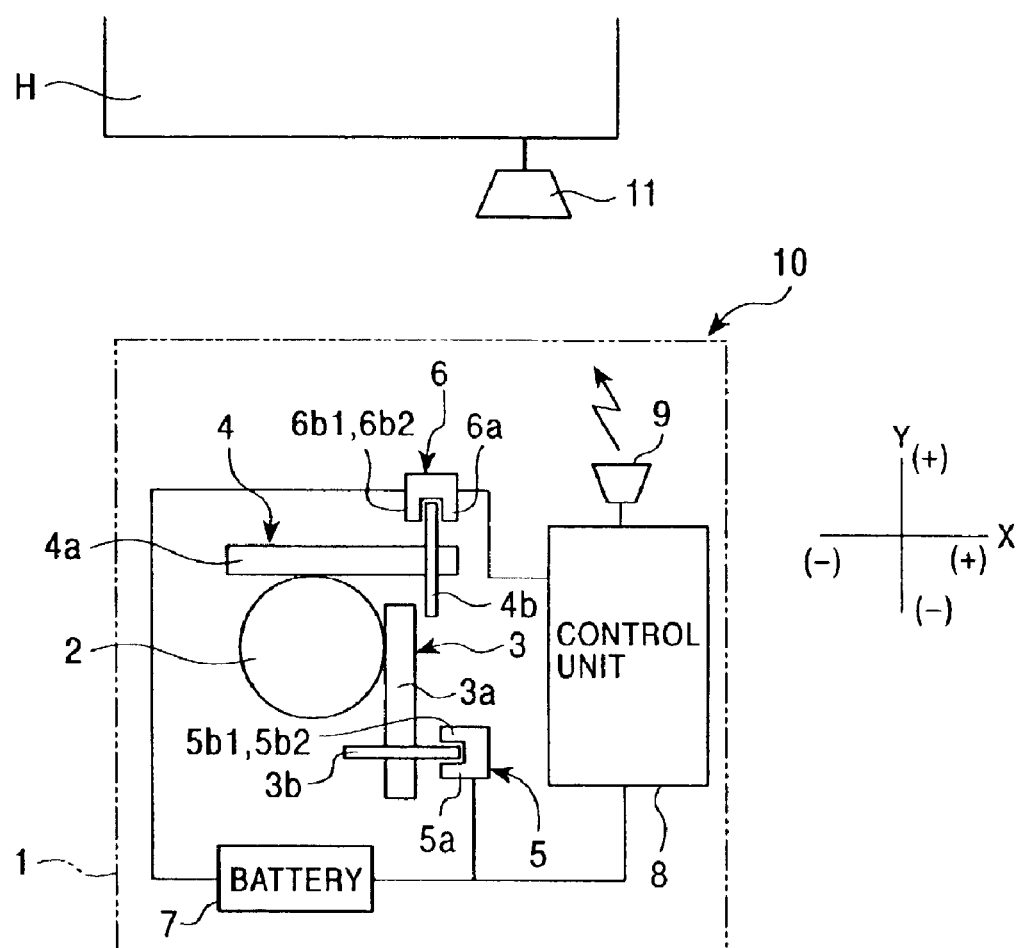
FIG. 1 is a functional block diagram of the internal configuration of an input device according to a first embodiment of the present invention.

FIG. 1 shows a functional block diagram of the internal configuration of an input device according to a first embodiment of the present embodiment.

Referring to FIG. 1, an input device 10 is a mouse type pointing device. The input device 10 has a case 1 made of a synthetic resin. The size of the case 1 is set so that the user can control the input device 10 while grasping the case 1. A ball 2 is received in the case 1. The ball 2 is rotatably held in the case 1 so that a part of the surface of the ball 2 is exposed from the bottom of the case 1. When the ball 2 exposed from the case 1 is applied to a pad and is then moved, the ball 2 can be rotated.

In the case 1, an X-axis encoder 3 and a Y-axis encoder 4, each of which is in contact with the ball 2 and is rotated thereby, are arranged perpendicularly to each other. The X-axis encoder 3 has a roller-shaped rotary shaft 3*a* disposed along the Y-axial direction (Y-direction). An X-axis rotary member 3*b* is formed at a portion close to one end of the rotary shaft 3*a*. The X-axis rotary member 3*b* is integral with the rotary shaft 3*a* so as to have the same axis as that of the rotary shaft 3*a*. In the Y-axis encoder 4, similarly, a rotary shaft 4*a* disposed along the X-axial direction (X-direction) and a Y-axis rotary member 4*b* are integrally arranged.

In each of the X-axis rotary member 3*b* and the Y-axis rotary member 4*b*, a plurality of light transmitting portions serving as slits are radially formed. The transmitting portions are formed at a predetermined pitch in the circumferential direction. Detecting means 5 for detecting the rotation of the X-axis rotary member 3*b* in the X-direction is arranged near the periphery of the X-axis rotary member 3*b*. Detecting means 6 for detecting the rotation of the Y-axis rotary member 4*b* in the Y-direction is disposed near the periphery of the Y-axis rotary member 4*b*.

Figure 2:
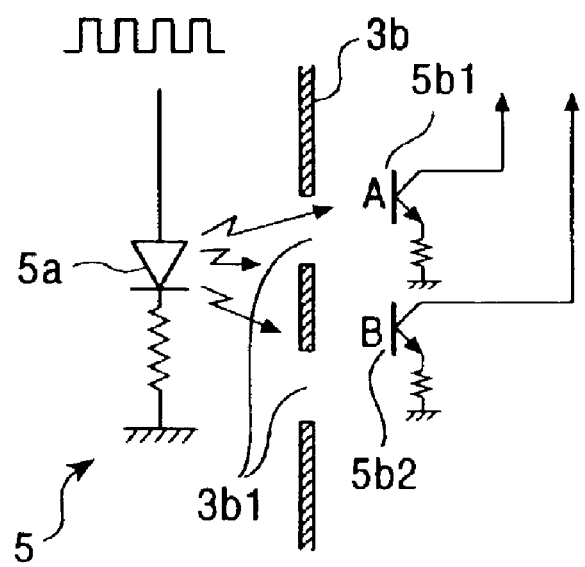
FIG. 2 is an explanatory diagram showing the configuration of detecting means provided for the input device.

FIG. 2 shows the detecting means 5 for detecting the rotation of the X-axis rotary member 3*b* in the X-direction.

The detecting means 5 comprises a light source 5*a* comprising a light emitting diode (LED), which faces the side of the X-axis rotary member 3*b*, and two photodetectors 5*b*1 and 5*b*2 each of which comprises a phototransistor and which face the other side of the X-axis rotary member 3*b*.

When detection light emitted from the light source 5*a* passes through transmitting portions 3*b*1 formed in the X-axis rotary member 3*b*, the photodetectors 5*b*1 and 5*b*2 receive the detection light. The photodetectors 5*b*1 and 5*b*2 are arranged at a distance from each other in the rotating direction of the X-axis rotary member 3*b*. The distance between the photodetectors 5*b*1 and 5*b*2 is set to ¼ of each arrangement pitch of the transmitting portions 3*b*1.

An output of the light detected by the photodetector 5*b*1 represents a phase A and an output of the light detected by the photodetector 5*b*2 represents a phase B (hereinbelow, each photodetector for detecting an output of the phase A will be referred to a phase-A photodetector and each photodetector for detecting an output of the phase B will be referred to a phase-B photodetector).

The Y-axis encoder 4 has the same structure as that of the X-axis encoder 4. The detecting means 6 for detecting the rotation of the Y-axis rotary member 4*b* in the Y-direction comprises a light source 6*a* and a phase-A photodetector 6*b*1 and a phase-B photodetector 6*b*2.

The case 1 includes a control unit 8 mainly comprising a CPU. The detecting means 5 and 6 supply the outputs indicating the phase A and the outputs indicating the phase B to the control unit 8. The control unit 8 calculates the amount of movement every predetermined time period of, for example, several tens of msec on the basis of the amount of movement detected by the detecting means 5 and the amount of movement detected by the detecting means 6. Communication means 9 supplies the calculated amount of movement to receiving means 11 of a host computer H every tens of msec.

According to the present embodiment, the communication between the communication means 9 and the receiving means 11 is achieved using radio waves. Wired communication means using a USB port can also be used.

The case 1 includes a power circuit 7 using a battery as a power supply. The power circuit 7 supplies power to the light sources 5*a* and 6*a* of the detecting means 5 and 6 and the control unit 8.

Figure 3:
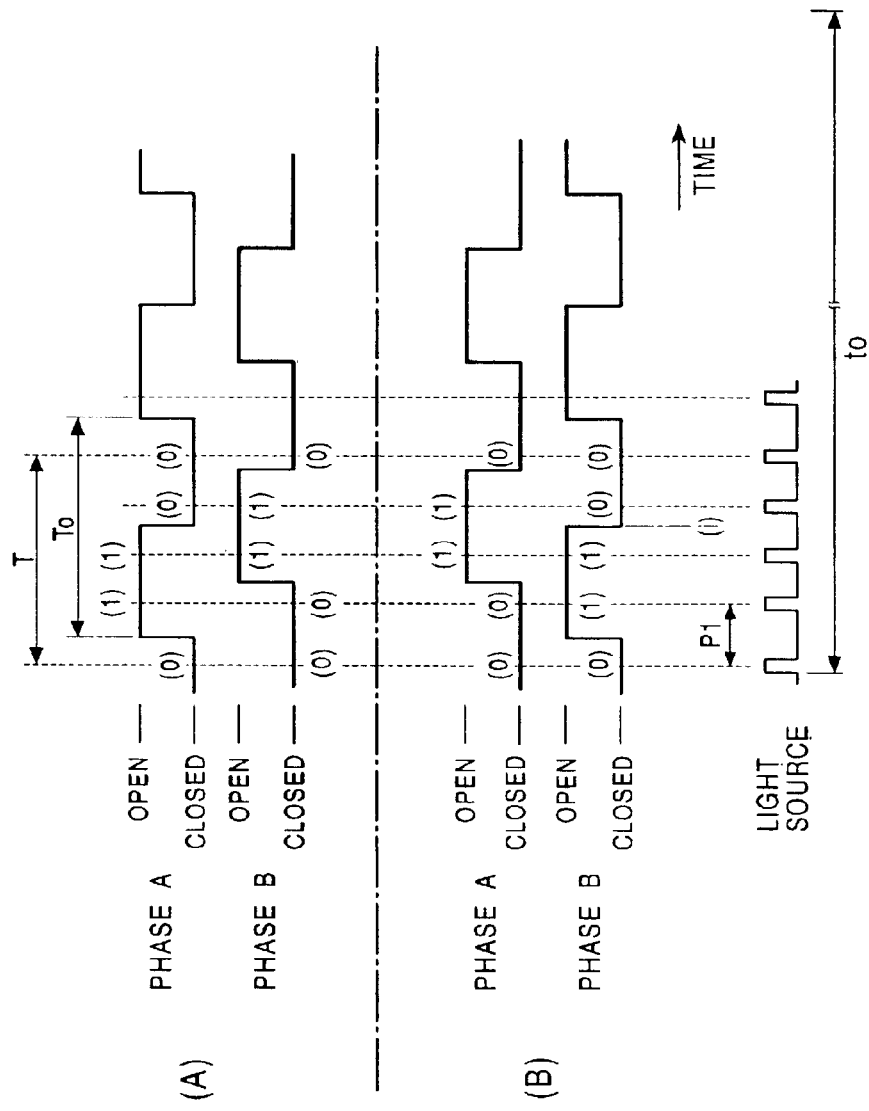
FIG. 3 includes parts (A) and (B), part (A) explaining detection times at which the input device is moved in a first direction and part (B) explaining detection times at which the input device is moved in a second directions.

FIG. 3 shows times at which the transmitting portions 3*b*1 of the X-axis rotary member 3*b* pass the phase-A photodetector 5*b*1 and the phase-B photodetector 5*b*2 in the X-axis encoder 3 shown in FIG. 2. Referring to FIG. 3, "open" denotes a time at which some transmitting portion 3*b*1 is located in the front of the phase-A photodetector 5*b*1 and "closed" denotes a time at which a portion other than the transmitting portions 3*b*1 in the X-axis rotary member 3*b* is located in the front of the photodetector 5*b*1 . For the phase-B photodetector 5*b*2, similarly, "open" denotes a time at which some transmitting portion 3*b*1 is located in the front of the photodetector 5*b*2 and "closed" denotes a time at which a portion other than the transmitting portions 3*b*1 is located in the front of the photodetector 5*b*2.

The Y-axis encoder 4 also has the same situations. Accordingly, an explanation will now be made with respect to the X-axis encoder 3.

In FIG. 3, the moving direction of the case 1 along the X axis, namely, the rotating direction of the ball 2 in the X-direction in part (A) is opposite to that in part (B).

FIG. 3 shows a situation in which the light source 5*a* intermittently emits light every driving period P1. In other words, the light source 5a emits detection light only for a short time every driving period P1. The light source 5a and the photodetectors 5b1 and 5b2 are positioned so that both of the phase-A photodetector 5b1 and the phase-B photodetector 5b2 can receive the detection light.

It is assumed that the rotating direction of the ball 2 along the X-direction indicates a first direction. As shown in part (A) of FIG. 3, when the transmitting portion 3b1 is located between the light source 5a and the phase-A photodetector 5b1, the photodetector 5b1 is ready to receive light. Reference numeral (1) denotes a state of the phase A at this time. When the transmitting portion 3b1 is not located between the light source 5a and the photodetector 5b1, the photodetector 5b1 is shaded. Reference numeral (0) denotes a state of the phase A at this time. For the phase-B photodetector 5b2, the similar states are also shown.

In part (A) of FIG. 3, the light source 5a is intermittently driven, a situation in which each of the phases A and B is set to the state (0) is changed to a situation in which the phase A is set to the state (1) and the phase B is held at the state (0). Subsequently, this situation is changed to a situation in which the phase A is held at the state (1) and the phase B is set to the state (1). Further, the situation is changed to a situation in which the phase A is set to the state (0) and the phase B is held at the state (1). After that, the situation is changed to a situation in which each of the phases A and B is set to the state (0). When both the phases are changed in this manner, the control unit 8 recognizes that the ball 2 is moved in the first direction along the X axis. A cycle T during which the outputs are changed is counted. Consequently, the number of counted cycles T represents the amount of rotation of the ball 2 in the first direction. When the number of counted cycles within a predetermined period to is recognized, a rotating speed of the ball 2, namely, a moving speed of the case 1 can be recognized.

It is assumed that the rotating direction along the X-axis of the ball 2 is opposite to the above direction, namely, the rotating direction denotes a second direction. As shown in part (B) of FIG. 3, on the basis of the intermittent driving time of the light source 5a, a situation in which each of the phases A and B indicates the state (0) is changed to a situation in which the phase A indicates the state (0) and the phase B is set to the state (1). This situation is then changed to a situation in which each of the phases A and B is set to the state (1). Further, the situation is changed to a situation in which the phase A is held to the state (1) and the phase B is set to the state (0). After that, the situation is changed to a situation in which each of the phases A and B is set to the state (0). When both the phases are changed in this manner, the control unit 8 recognizes that the ball 2 is moved in the second direction along the X axis. The cycle T during which the outputs are changed is counted. Consequently, the number of counted cycles T represents the amount of rotation of the ball 2 in the second direction. When the number of counted cycles within the predetermined time period to is recognized, the rotating speed of the ball 2, namely, the moving speed of the case 1 can be recognized.

The control unit 8 can also detect the rotating speed of the ball 2, namely, the moving speed of the case 1 for the time period to by counting the cycles T every time period to of, for example, 25 msec. The control unit 8 supplies data regarding the speed to the host computer H every time period to. The host computer H realizes display of the motion of a cursor on a display screen on the basis of the moving speed.

According to the present embodiment, the control unit 8 changes the driving period in the next time period to during which the light source 5a emits light to be shorter or longer than the driving period P1 on the basis of the number of counted cycles T within the time period t0, namely, the moving speed of the case 1. The driving period P1 can be changed every time period t0 or can also be changed every time period shorter or longer than the time period t0. In order to synchronize the time period with a period of transmitting data from the input device 10 to the host computer H. preferably, the time period every which the driving period is changed is equivalent to the time period t0. Alternatively, an integer multiple of the time period t0 or an integer multiple of (1/t0) is preferably used.

The relationship between the output of the phase A, the output of the phase B, and the driving period P1 will be considered. As will be understood from FIG. 3, when the light source 5a emits light four times in one cycle T0 including the opening state and the closing state of the transmitting portions 3b1, the moving direction of the case 1 and the amount of movement thereof within a predetermined period can be detected. In the case of the maximum theoretical driving period P1, four light emissions are realized in one cycle T0. Preferably, the light source 5a actually emits light four times or more, or an integer multiple of four times.

FIG. 5 shows the relationship between the operating speed of the case 1 and the driving period of the light source 5a necessary for the corresponding operating speed as one sample.

Referring to FIG. 5, when the case 1 is stopped, namely, a push switch provided on the case 1 is operated or the case 1 is not operated, the operating speed is held at 0 mm/sec. Accordingly, the light emitting period (sampling period) at this time can be set to be long, for example, 50 msec. When the case 1 is moved at a very low speed (5 mm/sec) so that the case 1 is repetitively stopped and moved slightly in the operation of finally positioning a mouse pointer, the light emitting period is set to be short to a certain degree, for example, 5 msec.

While the case 1 is moved at a low speed of 50 mm/sec so that the mouse pointer is brought close to a target position, the light emitting period is set to 500 μsec. While the case 1 is moved at a middle speed (100 mm/sec) at which the mouse pointer can be visually checked, the light emitting period is set to 300 μsec. While the case 1 is moved at a high speed (200 mm/sec) at which the general position of the mouse pointer can be visually grasped, the light emitting period is set to 150 μsec.

As mentioned above, the operating speed is recognized every time period t0 or every time period that is an integer multiple of the time period t0. When it is recognized that the operating speed varies every time period, the driving period (light emitting period) is changed every time period on the basis of the change of the speed.

When the driving period is changed in accordance with the operating speed as mentioned above, power consumption in the light source 5a can be reduced while the moving speed in the X-axial direction and that in the Y-axial direction and resolution for the respective moving directions are maintained.

FIG. 4 is a graph showing the relationship between the actual speed and the distance when the user moves the case 1 of the input device 10 in one direction (P→Q) at the maximum operating speed. Generally, each of the ball 2, the X-axis encoder 3, and the Y-axis encoder 4 exhibits inertia. Skid occurs between the ball 2 and the encoders 3 and 4. Further, skid also occurs between the ball 2 and the pad.

Accordingly, if the user moves the input device 10 at the maximum speed, actually, the rotating speed of each of the X-axis rotary member 3b and the Y-axis rotary member 4b varies in a curve as shown in FIG. 4.

Therefore, the amount of movement (the number of counted cycles T) for, for example, the time period t0 is compared with the amount of movement for the preceding time period t0 to recognize the change in speed. The driving period is changed for the next time period t0 on the basis of the recognized change. Thus, the resolution following the operation can be realized as shown in FIG. 4.

In order to prevent false detection, when an increase in speed is recognized, the amount of change in the driving period to be reduced is increased. For example, the following control is preferable. In FIG. 5, the driving period is immediately reduced from 50 msec to 500 $\mu$sec. When the speed is further increased, the driving period is reduced to 100 $\mu$sec at which the maximum resolution can be realized.

On the other hand, upon reduction of the speed, when the driving period is extended at a time, false detection may be caused. Therefore, upon reduction of the speed, preferably, the driving period is gradually extended from, for example, 100 $\mu$sec to 150 $\mu$sec and is then extended to 300 $\mu$sec. Alternatively, when the speed trends to be reduced, the speed reducing state is observed slowly for several time periods t0 and a time when the driving period is extended can be delayed.

While it is detected that the case 1 is moved in the first direction shown in part (A) of FIG. 3, if the pattern shown in part (B) of FIG. 3 temporarily appears, the control unit 8 of the input device 10 predicts that the case 1 is currently moved in the first direction and then can execute a compensating process of temporarily ignoring the pattern shown in part (B) of FIG. 3 or the like.

When the edge (for example, the edge shown by reference symbol (i) in part (B) of FIG. 3) of the transmitting portion 3b1 of the X-axis rotary member 3b faces the photodetector 5b1 or 5b2, the situation in which the phase A is set to the state (0) and the phase B is set to (1) and the situation in which the phase A is set to the state (1) and the phase B is set to (0) may occur repetitively. Such a situation pattern is equivalent to a case where the situation pattern shown in part (A) of FIG. 3 and that shown in part (B) of FIG. 3 repetitively appear. The case results in fluctuation of the cursor on the screen of the host computer.

When the situation pattern repetitively appears, the control unit 8 can also ignore the situation pattern and compensates so that the same data as that obtained while the case 1 is stopped is continuously transmitted to the host computer.

Figure 6:
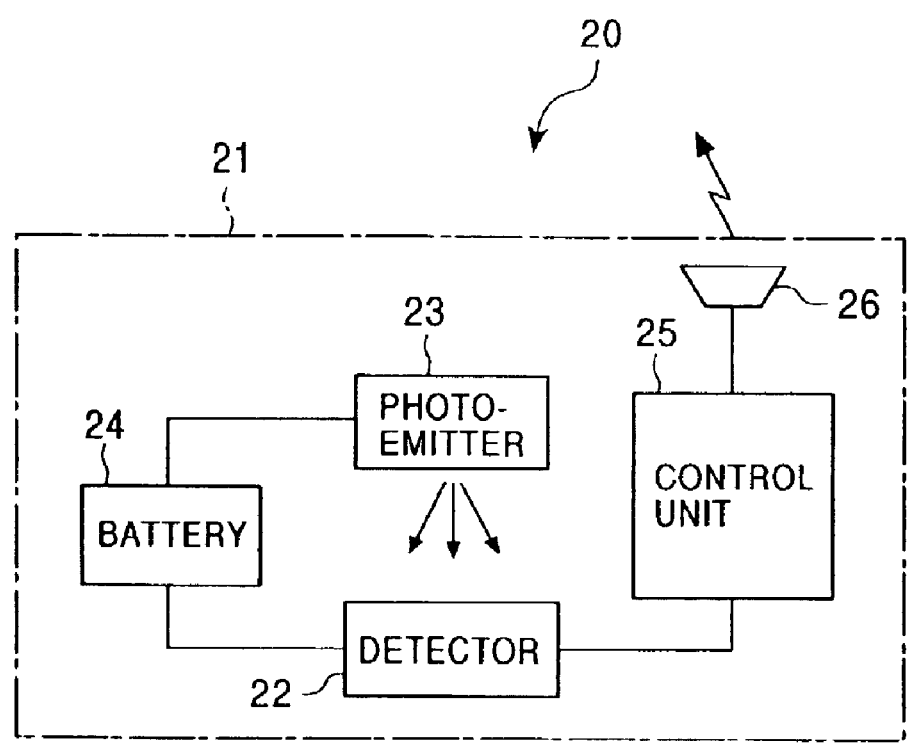
FIG. 6 is a functional block diagram of the internal configuration of an input device according to a second embodiment of the present invention.

FIG. 6 is a functional block diagram of an input device according to a second embodiment of the present invention.

An input device 20 is a mouse type pointing device having no ball. When the input device 20 is moved on the surface of a pad or a table serving as a reference element, the input device 20 detects the movement of an image of the reference element to recognize the amount of movement and the moving speed of the input device 20 in the X-direction and the amount of movement and the moving speed thereof in the Y-direction.

The input device 20 has a case 21. The case 21 includes a detector 22 such as a CCD camera which can capture the image of the reference element in a predetermined range and a photoemitter 23 such as a light emitting diode (LED) or the like for irradiating the reference element in order to easily capture the image thereof.

The case 21 also includes a control unit 25 which has an image processing function. The detector 22 comprises a CCD and detects the variations of light and shade serving as the predetermined number of dots. The control unit 25 recognizes the image in a predetermined range on the basis of the light and shade. On the basis of the movement of the image in association with the movement of the case 21, the control unit 25 can detect the amount of movement and the moving speed in the X-direction and the amount of movement and the moving speed in the Y-direction.

A power circuit 24 supplies power to the photoemitter 23, the detector 22, and the control unit 25.

In the input device 20, due to the control operation of the control unit 25, the photoemitter 23 is driven so as to intermittently emit light every predetermined driving period. The control unit 25 can recognize an image detected by the detector 23 synchronously with the light emission time. The control unit 25 includes a memory unit for storing a reflected image of the reference element detected and recognized by the detector 22 when the photoemitter 23 emits light. The control unit 25 recognizes and stores a reflected pattern image each time the photoemitter 23 emits light, compares the present reflected pattern image with the reflected pattern images stored before, calculates the amounts of movement of the case 21 in the X- and Y-directions, and then supplies the amounts of movement to receiving means of a host computer through communication means 26.

In the control operation, when the case 21 is stopped or is moved at a low speed, the driving period for light emission of the photoemitter 23 is extended. When the case 21 is moved at a high speed, the driving period is reduced.

The control method is the same as that according to the foregoing first embodiment. The moving speed is recognized every, for example, time period to every which data is transmitted to the host computer H. When the moving speed is increased, the driving period for light emission is reduced so that the movement of the image which moves at a high speed can be detected with high precision. As mentioned above, the driving period for light emission of the photoemitter 23 is changed in accordance with the moving speed of the input device 20, resulting in an increase in resolution for the moving speed and a reduction in power consumption.

The present invention can also be applied to a ball type or roll type input device which is mounted on a notebook-sized personal computer and to which the amount of movement of the input device by the user's hand is input.

According to the present invention, the power consumption of the input device for recognizing the amount of movement thereof can be reduced without deteriorating resolution.

What is claimed is:

1. An intermittent operating type pointing device comprising:

detecting means which can detect an amount of movement due to an external operating force and which performs an intermittent detecting operation every driving period, and a control unit which changes a driving period of the detecting means in accordance with the amount of movement detected by the detecting means within a predetermined time, wherein data based on a detection output of the detecting means is transmitted to a host computer.

2. A device according to claim 1, wherein the detecting means comprises:

an X-axis rotary member rotating in the X-axial direction;

a Y-axis rotary member rotating in the Y-axial direction;

light sources each of which emits detection light to the corresponding rotary member; and photodetectors each of which detects the detection light transmitting through the corresponding rotary member or the detection light reflected by the corresponding rotary member, each of the rotary members has one of light transmitting portions and light reflecting portions formed in the rotating direction at a predetermined pitch, each of the light sources intermittently emits light every predetermined driving period, and a light emitting period of each light source is changed in accordance with one of a number of light transmitting times and a number of light reflecting times in the corresponding rotary member within the predetermined time.

3. A device according to claim 1, wherein the detecting means includes a light source that emits light to a reference element and a detector that detects an image of the reference element irradiated by the light emitted from the light source to detect movement of the image, the light source intermittently emits light every predetermined driving period, and a light emitting period of the light source is changed in accordance with a moving speed of the image of the reference element.

4. A device according to claim 1, wherein the control unit recognizes the amount of movement detected by the detecting means every time period, and changes the driving period for a next time period in accordance with the amount of movement detected for a present time period.

5. A device according to claim 4, wherein when the amount of movement increases for the present time period, the control unit gradually reduces the driving period for the next time period, and when the amount of movement decreases for the present time period, the control unit gradually extends the driving period for the next time period.

6. A device according to claim 5, wherein the driving period is controlled so that the amount of change in the driving period to be extended is smaller than the amount of change in the driving period to be reduced.

* * * * *

UNITED STATES PATENT AND TRADEMARK OFFICE
CERTIFICATE OF CORRECTION

PATENT NO.   : 6,847,031 B2
DATED        : January 25, 2005
INVENTOR(S)  : Sadakazu Shiga It is certified that error appears in the above-identified patent and that said Letters Patent is hereby corrected as shown below:

<u>Column 9,</u>
Line 9, after "detects" insert -- one of --.
Line 11, before "the detection" delete "or" and substitute -- and -- in its place.
Line 14, after "formed in" delete "the" and substitute -- a -- in its place.

Signed and Sealed this

Twenty-fourth Day of May, 2005

JON W. DUDAS
*Director of the United States Patent and Trademark Office*